(12) United States Patent  (10) Patent No.: US 9,237,457 B2
Finck et al.  (45) Date of Patent: Jan. 12, 2016

(54) METHOD AND APPARATUS FOR IDENTIFYING NETWORK NODES

(71) Applicant: CELLCO PARTNERSHIP, Basking Ridge, NJ (US)

(72) Inventors: Wesley H. Finck, Southlake, TX (US); Mariko M. Savage, Coral Springs, FL (US); Stephen R. Rainbolt, Southlake, TX (US); William H. Martin, Grapevine, TX (US)

(73) Assignee: Cellco Partnership, Basking Ridge, NJ (US)

( * ) Notice: Subject to any disclaimer, the term of this patent is extended or adjusted under 35 U.S.C. 154(b) by 256 days.

(21) Appl. No.: 13/683,664

(22) Filed: Nov. 21, 2012

(65) Prior Publication Data

US 2014/0141786 A1    May 22, 2014

(51) Int. Cl.
*H04W 40/00*    (2009.01)
*H04W 16/18*    (2009.01)

(52) U.S. Cl.
CPC .................................... *H04W 16/18* (2013.01)

(58) Field of Classification Search
USPC ........................................................ 455/446
See application file for complete search history.

(56) References Cited

U.S. PATENT DOCUMENTS

| | | | |
|---|---|---|---|
| 2008/0039064 A1* | 2/2008 | Cai et al. .................... | 455/422.1 |
| 2011/0235574 A1 | 9/2011 | DaSilva et al. | |
| 2014/0341014 A1* | 11/2014 | Kim et al. ..................... | 370/229 |

* cited by examiner

*Primary Examiner* — Chuck Huynh (57) ABSTRACT

Each evolved node B (eNB) or each cell site included in a network is uniquely identified. Identifiers may be assigned to geographical segments of a geographic area spanned by a network and to the cell sites included in each geographic segment. The eNBs included in each cell site are also assigned cell site-level identifiers. An individual eNB is assigned a unique identifier that combines the identifier of the geographical segment including the eNB, the geographical segment-level identifier of cell site corresponding to the eNB, and the cell site-level identifier of the eNB. Cell sites are also identified using an identifier value that combines the system identification number assigned to each cell, a value identifying devices used to provide connectivity to the cell, and a number assigned to each cell into a unique identifier value for the cell site.

21 Claims, 7 Drawing Sheets

METHOD AND APPARATUS FOR IDENTIFYING NETWORK NODES

BACKGROUND

Some communication standards require that identifiers be assigned to infrastructure network devices and user equipments to ensure that each device or equipment is uniquely identified. For example, the Long Term Evolution (LTE) standard, which is a standard for wireless communication of high-speed data for mobile phones and data terminals, requires a unique identifier to be assigned to each cell and/or each Evolved Node B (eNB) associated with each cell within a network. Using the assigned identifiers, each cell is uniquely identified and distinguished from other cells included in the network. The uniquely assigned identifiers are used to track, record, and analyze cell-related factors, such as traffic, capacity, usage, and data volume, or make changes to the infrastructure of the network.

In the United States, LTE eNBs are often identified using six digit identifiers. Each eNB identifier (eNB ID) comprises of two parts: a market identifier (Market ID) that identifies the area or market at which the eNB is positioned and an eNB value (or eNB count) that describes the specific eNB being identified. The market ID is typically a three-digit identifier (e.g., area code) assigned by the Federal Communications Commission (FCC) or the North American Numbering Plan Administration (NANPA). The eNB value is commonly three digits and is assigned by the service provider providing communications services via the eNB.

In the recent years, LTE networks have been growing to support the increasing demand for wireless bandwidth. Additional eNBs have been deployed to support the growing LTE networks such that, in some markets, the traditional three-digit eNB value representation scheme is no longer able to uniquely represent all of the deployed eNBs. In such markets, four-digit identifiers are used to represent the eNB value. However, in the areas that use four digit identifiers, the common identification scheme requires that the leftmost or the rightmost digit of the four-digit identifier is dropped when recording the eNB value. This results in having duplicate eNB values, can result in the traffic being recorded improperly, and can cause analysis and correction problems.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Figure 1A:
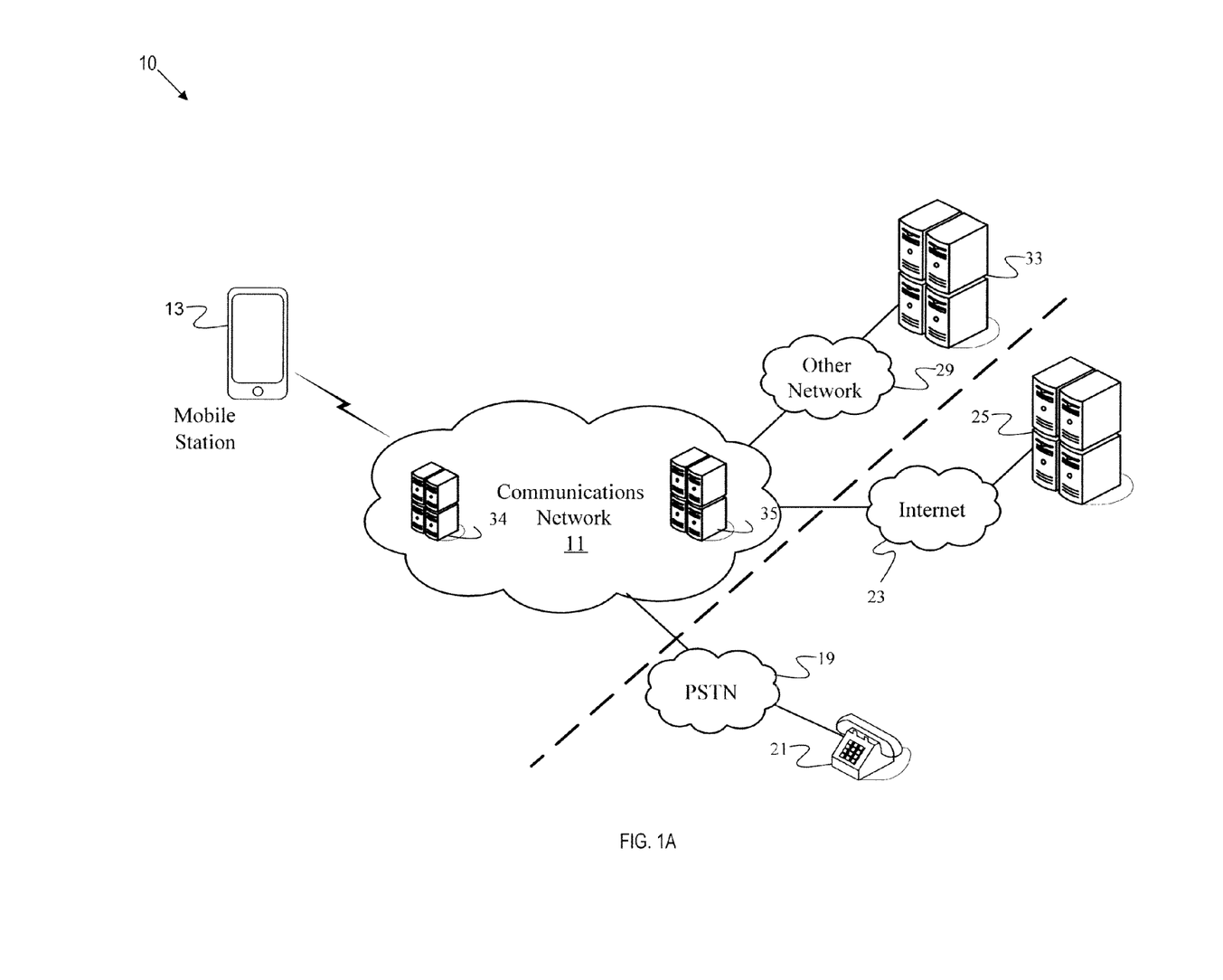
FIG. 1A is a block diagram of a system for providing mobile communications services that utilize an identifier assignment technique.

FIG. 1A is a block diagram of a system for providing mobile communications services. As shown in FIG. 1A, a mobile communications network 11 provides a mobile station 13 with connectivity features. Although the mobile network 11 may utilize various communications technologies (e.g., Global System for Mobile Communications (GSM) or LTE), for purposes of discussion only, FIG. 1 is assumed to illustrate an LTE mobile network 11.

The mobile communications network 11 provides the mobile station 13 with mobile voice telephone communications as well as messaging and/or data communications services. The term mobile station 13, as used herein, is intended to refer to any mobile unit that may receive mobile voice, messaging or data services via the mobile communications network 11. Examples of the mobile station 13 include, but are not limited to, mobile phones, mobile tablets, Personal Digital Assistants (PDA), portable televisions, laptop computers, portable digital video recorders, etc.

Hence, the mobile station 13 may take the form of a mobile telephone station or a mobile tablet and be enhanced with display and user input capabilities in order to support certain text and image communications, such as email, picture communication and web browsing applications. Further, the mobile station 13 may be a portable computing device that utilizes a wireless modem card (not shown). For example, the mobile station 13 may be a personal computer that includes a wireless modem card. The mobile station 13 may take the form of a personal digital assistant (PDA) incorporating a wireless transceiver compatible with the particular type of data service offered by the mobile communications network 11. The mobile stations 13 may further include data communication capabilities. The mobile station 13 may take other forms or connect to a variety of data devices that may enable use of the mobile communications network 11. For purposes of an illustrative example, the drawing shows the mobile station 13 in the form of a touch screen type smart phone.

The mobile communications network 11 provides a user (not shown) of the mobile station 13 with connectivity in a number of ways. For example, the mobile communications network 11 connects the mobile station 13 to other mobile stations (not shown) connected to the same mobile network 11. The mobile communications network 11 further provides the station 13 with connectivity to devices 21 connected to the public switched telephone network 19 (PSTN). Further, the mobile communications network 11 provides the mobile station 13 with connectivity to devices 25 connected to public data network 23 (referred to as the Internet 23). Through the mobile communications network 11, a user (not shown) of the mobile station 13 is able to send/receive data to/from other devices that have access to the Internet 19, such as servers, hosts and personal computers 27 coupled to the Internet 23. Furthermore, the mobile communications network 11 provides the mobile station 13 with connectivity to devices 33 connected to other networks 29, such as private intranets.

Figure 1B:
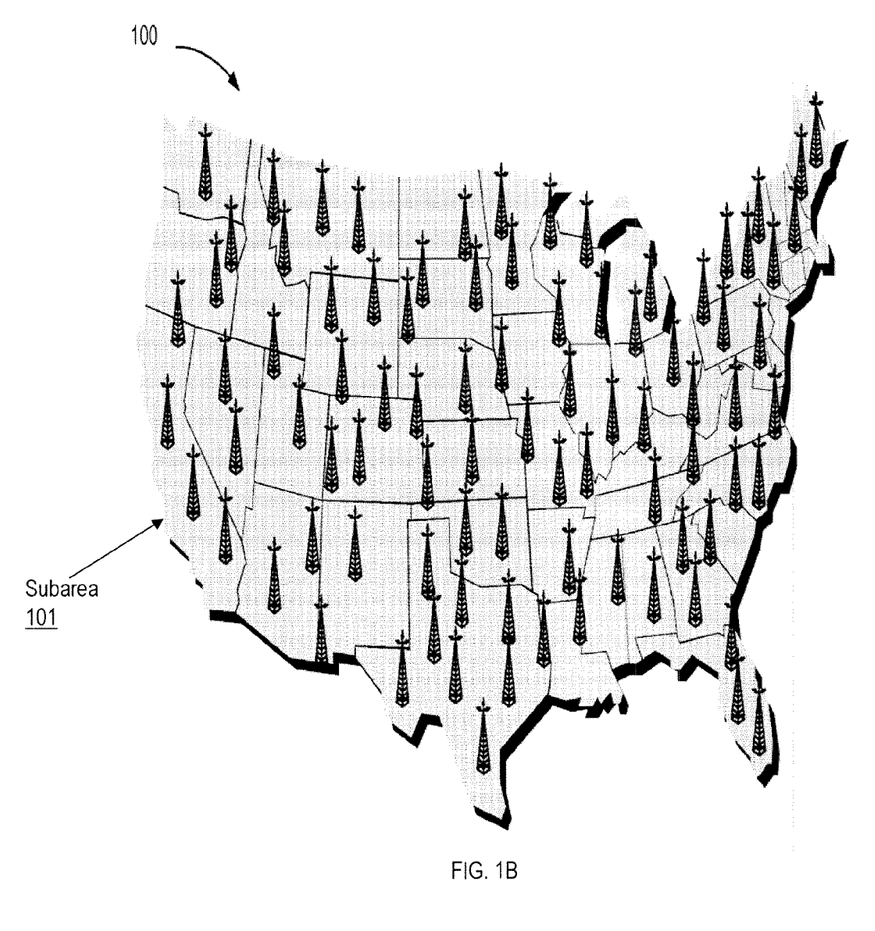
FIG. 1B illustrates an example of a geographical area that may be spanned by a communications network.

The mobile communications network 11, shown in FIG. 1A, spans a geographical area. FIG. 1B illustrates an example of a geographical area 100 (e.g., the continental United States) that may be spanned by the communications network 11. The geographical area 100 spanned by the network 11 is divided into a number of subareas 101 and each geographical subarea 101 is assigned a market identifier value (not shown) for identification purposes.

The geographical area 100 is divided into the subareas using existing rules and conventions. For example, since each region of the United States has already been assigned an area code thereto, the geographical area 100 may be divided by determining the regions corresponding to each area code and dividing the geographical area 100 such that each resulting subarea includes the regions covered by one or more area codes. Additionally or alternatively, other division schemes may be used. For example, major cities in the geographical area 100 may be identified, and the geographical area 100 may be divided such that each resulting subarea contains at least one major city and its suburban communities. Features such as voice telephone communications and/or data communications services traffic may be considered in determining the areas identified as major cities. Alternatively or additionally, geographical dimensions and expected network traffic may be considered in dividing the geographical area 100. For example, the geographical area 100 may be divided such that each resulting subarea covers certain geographical dimensions (e.g., 200 mile radius of a major city). Further, the geographical area 100 may be divided such that the resulting subarea covers a certain amount of expected communications traffic (e.g., each subarea should include at least x-min number of users and at most x-max number of users).

Regardless of how the geographical subareas are configured, each geographical subarea is assigned a unique identification value that is used to uniquely identify that subarea. In North America, the area code associated with the subarea 101 is used, in some examples, as the market identifier value of that subarea 101. The identification value assigned to each subarea is often a previously configured value. For example, in the United States (or in North America), the three digit area code identifier assigned by the FCC or NANPA is used to uniquely identify corresponding regions. Other assignment schemes may be used to assign identifiers to a geographical subarea 101. For example, a service provider, providing the communications network 11 with connectivity services, may assign the market value identifiers to the geographical subareas spanned by the network 11.

Although the market Identifier value may have any number of elements and any type of elements (alphabetical, alphanumerical, or numerical) to work with the examples described herein, in the description presented below, market identifier values are described as three-digit numerical identifiers.

An arbitrary maximum value limit may be imposed on the number of subareas (hereinafter referred as market areas) that are uniquely represented by the geographical subarea/market identifier (hereinafter referred as Market ID). For example, a maximum value limit M is imposed on the number of markets that are represented using the Market ID. In such case, M unique three-digit identifiers are used to represent M corresponding markets. For example, if M=269, a maximum of 269 market areas are uniquely represented by 269 corresponding Market IDs.

When using three digit numerical identifiers to represent the market areas, Market IDs ranging between 000 and 999 are assigned. Accordingly, a maximum of M=1000 market areas are uniquely represented using the available Market IDs (i.e., Market IDs ranging between 000 and 999).

Figure 1C:
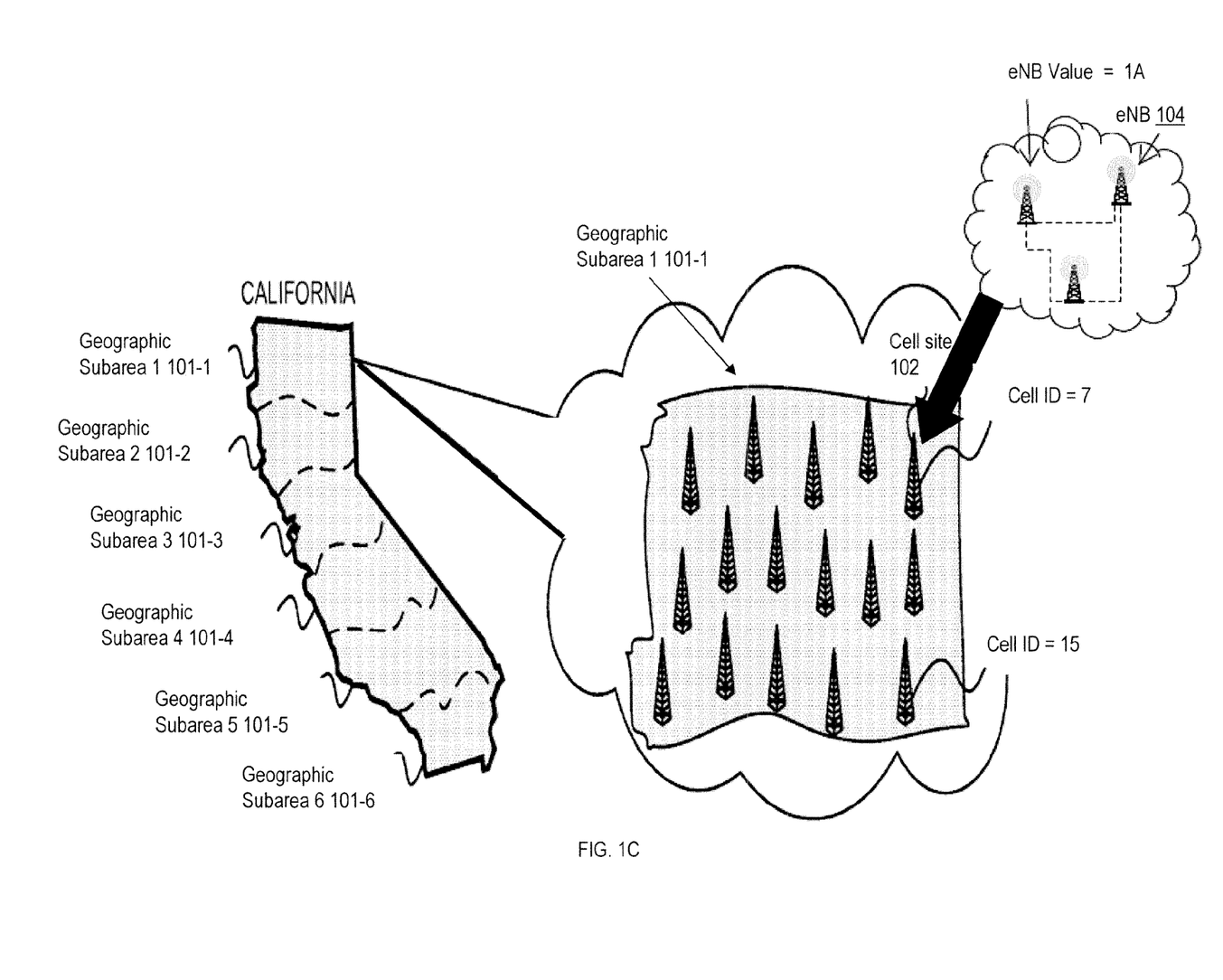
FIG. 1C is an illustration of a geographic area, corresponding cell sites, and evolved nodes to which identifiers are assigned.

FIG. 1C is an illustration of a geographic area, corresponding cell sites, and evolved nodes to which identifiers are assigned. As explained previously, the entire region 100 (the United States in the example shown in FIG. 1A) spanned by a network 11 is segmented into a number of market areas, and each market area is uniquely represented using a Market ID. In the example shown in FIG. 1C, the geographic area covered by the state of California is divided into 6 geographic market areas (or subareas) 101-1, ..., 101-6.

Each market area 101-1, ..., 101-6 includes a number of cell sites 102. The term cell site refers to a site where elements including antennas and electronic communications equipments (e.g., transmitters and receivers) are placed. The cell sites 102 communicate with mobile stations, using their respective transmitters and receivers, to provide the network 11 (FIG. 1A) with mobile/wireless network connectivity. Although not shown, the network 11 typically includes landline connectivity to and from the cell sites and packet switches or other routing elements, for voice and/or packet data transport to and from the evolved nodes and to thereby connect the nodes into the overall communications network 11.

Each cell site 102 within a market area 101-1, ..., 101-6 is uniquely identified using an identifier value. The cell site identifier value may be assigned by the service provider (not shown) maintaining the cell site or by any other authority overseeing performance and/or maintenance of the cell site.

Although the cell site identifier value may have any number of elements and any type of elements (alphabetical, alphanumerical, or numerical) to work with the examples covered in the description presented below, the cell site identifier values are described as four-digit numerical identifiers.

A maximum value limit may be imposed on the number of cell sites 102 that are uniquely represented by the cell site identifier value. For example, a maximum value limit N is imposed on the number of cell sites that are represented using the cell site value. In such case, N unique four-digit identifiers are used to represent N cell sites. For example, if N=20, a maximum of 20 cell sites are uniquely represented by 20 corresponding cell site value. In the example of FIG. 1C, two cell sites having cell site value=7 and cell site value=15 are shown.

When using four digit numerical identifiers to represent the cell sites, cell site values ranging between 0000 and 9999 are assigned. Accordingly, a maximum of N=10000 cell sites are uniquely represented using the available cell values (i.e., cell values ranging between 0000 and 9999). The cell site values need not to be assigned based on any specific order or according to any specific rule. Various numbering assignment schemes may be used to assign the cell site values. Examples of the numbering assignments that are used include sequential number assignment as cell sites are built out and come on-line, random number assignment (e.g., using a random number generator that assigns the cell site values by selecting a number from the available range of numbers (0000 and 9999) while considering already assigned numbers), and pseudorandom number assignment.

In LTE networks, in each cell sector 102 a plurality of eNBs 104 are deployed to provide wireless connectivity for mobile stations. The eNBs 104 serve as the radio access part of the LTE network and include elements including a radio transmitter, receiver, control section, and power supply. These elements allow the eNBs 104 to directly communicate with one another, via packet switches.

Each eNB 104 deployed at a cell site 102 is also assigned an identifier value that is used to uniquely identify the eNB 104. The eNB value may be assigned by the service provider (not shown) maintaining the eNB 104 or by any other authorities overseeing performance and/or maintenance of the eNB 104.

Although the eNB value may have any number of elements and any type of elements (alphabetical, alphanumerical, or numerical) to work with the examples covered in the description presented below, the eNB values are described as two-character alphanumerical identifiers. For example, each two-character alphanumerical identifier includes a first numerical character having a value ranging between 0-9, and a second alphabetical character having characters ranging from A to Z. Using this identification scheme, each eNB 104 associated with a cell site 102 is identified using an identifier ranging from 1A to 9Z.

The alphanumerical value assigned to each eNB 104 at a given cell site 102 is assigned as a function of the spectrum and number of eNBs at that cell site. The alphabetical character denotes the spectrum or frequency band at which the specific eNB operates, whereas the numerical character indicates the number or count assigned to each eNB 104 operating at the frequency spectrum or band identified by the alphabetical character.

Currently, many spectrum blocks may be used in the United States for providing wireless services and alphabet letters may be used to split up different areas of the spectrum. Some common spectrums used by commercial wireless companies, for example, include Original Cellular Spectrum—broken up into A band and B blocks, PCS Spectrum—broken up into A, B, C, D, E, and F blocks, Advanced Wireless Services (AWS) Spectrum—blocks A, B, C, D, E, and F. Lower 700 Spectrum—blocks A, B, C, D, and F. Upper 700 Spectrum—blocks C and D, Nextel Spectrum—not broken into blocks The FCC administrates the spectrum blocks and issues licenses to various blocks of the spectrum.

A maximum value limit may be imposed on the number of eNBs 104 that may be uniquely represented by the eNB value. For example, a maximum value limit K may be imposed on the number of eNBs 104 that may be represented using the eNB value. For example, if K=6F, a maximum of 42 (7 eNBs in each of the 6 spectrums denoted by A-F) eNBs may be uniquely represented by 42 corresponding eNB values. In example of FIG. 1C, an eNB having eNB value=1A is shown.

When using two character alphanumerical identifiers to represent the eNBs, eNB values ranging between 0A and 9Z may be assigned. Accordingly, a maximum of N=260 eNBs may be uniquely represented using the available eNB value (i.e., eNBs ranging between 0A and 9Z).

The numerical character included in the eNB value need not to be assigned based on any specific order or according to any specific rule. Various numbering assignment schemes may be used to assign the numerical character. Examples of the numbering assignments that are used include sequential number assignment, random number assignment (e.g., using a random number generator that assigns the numerical character by selecting a number from the available range of numbers (0 and 9) while considering already assigned numbers), and pseudorandom number assignment. Other examples of the numbering assignments include assigning numbers geographically, such that similarly geographically-located cell cites and/or eNBs in different locations are assigned similar numbers/letters.

Although currently a single numerical character is used to identify the eNBs deployed at each spectrum band, thereby limiting the number of eNBs that may be represented to 10 eNBs per spectrum, one or more additional characters may be used, if required. For example, if future expansions of an LTE network requires that more than 10 eNBs are deployed at a frequency band, eNB values having additional numerical characters may be deployed.

The identification scheme, described thus far, enables unique identification of an eNB within each cell site. The identification scheme also allows for each cell site to be uniquely identified within its corresponding market area. The market areas are further uniquely identified using their respective identifier (as assigned by the FCC or the NANPA). Accordingly, an eNB may be identified, from among all eNBs supporting the LTE network, using an identifier that includes a combination of the Market ID of the market area including the eNB, the cell Site value of the cell site supported by the eNB, as well as the unique eNB value assigned to the eNB within the cell site. Specifically:

eNB ID=Market ID. cell site value. eNB value

The above ordering of the Market ID, cell site value, and eNB value provide the information necessary to uniquely identify the intended eNB. Other orders and combinations of the Market ID, cell site value, and eNB value may be used. The eNB ID may be calculated and assigned by the Operation Administration Maintenance (OAM) server 34 residing within the network 11. To illustrate one specific example, the OAM server 34 receives the cell site value and eNB value from along with traffic data from eNB 104. The cell site value and eNB value may have been previously assigned to the eNB 104. For example, the service provider's technician using his/her laptop may program the eNB 104 with the cell site value and eNB value. Upon receiving the traffic data from eNB 104, the OAM server 34 may extract the identification information (e.g., the cell site value and eNB value) from the traffic data and may also extract the Market ID from the traffic data. The Market ID may be determined from the IP address associated with the eNB 104. Upon identifying the Market ID, the cell site value, and eNB value, the OAM server 34 may generate eNB ID and may store the eNB ID within its database. The OAM server 34 may then arrange and store the traffic data received from eNB 104 within a database along with the associative eNB ID. The OAM server 34 may be programmed to pull data from eNB 104 at a specific interval of time based on the stored information. For example, the OAM may be programmed to pull data from eNB 104 every 15 minutes. Alternatively, the eNB 104 may be programmed to push its data to the OAM server 34 at a specific interval of time based on the stored information. The data may include alarms and traffic counter. The alarms may include overheat, fan failure, memory count information associated with the eNB 104. The traffic counter may include amount of data that goes through the eNB 104. After transmitting the data to the OAM server 34, the eNB 104 may reset its data counter and may begin accumulating new data. Using the example format presented above, the eNB ID of a given eNB within the entire geographical area is uniquely represented with a nine-digit alphanumerical identifier (eNB ID) ranging from 000.0000.0A to 999.9999.9Z. This format allows for up to 2,600,000,000 eNBs to be uniquely represented. Currently, most wireless service providers are estimated to utilize less than 300,000 eNBs. Specifically, given that most wireless service providers currently utilize less than or about 50,000 cell sites and assuming that each cell sites currently includes a maximum of 6 eNBs, an estimated maximum number of 300,000 eNBs are currently utilized by each service provider. Accordingly, the present format can be used to uniquely identify deployed eNBs utilized by the wireless service providers. Given the large number of eNBs that may be uniquely represented using the format presented herein, future expansions of LTE networks and deployment of additional eNBs can also be uniquely represented. For example, assuming that an additional 50,000 cell sites are utilized, totaling the number of cell sites per service provider to 100,000 cell sites, the current format can still uniquely represent the addition of 26,000 eNBs to each cell site.

Once an eNB is uniquely identified, the identification information is used to uniquely relate an eNB to its corresponding data traffic. The data traffic information that may be accumulated from monitoring of eNB operations includes information such as historical amount of data or voice communications traffic at any given hour at the eNB, expected data traffic, eNB traffic capacity, eNB performance data, data regarding devices connected to the eNB, data volume, number of calls dropped by the client devices, data regarding overall operating conditions of the eNB, etc.

Figure 1D:
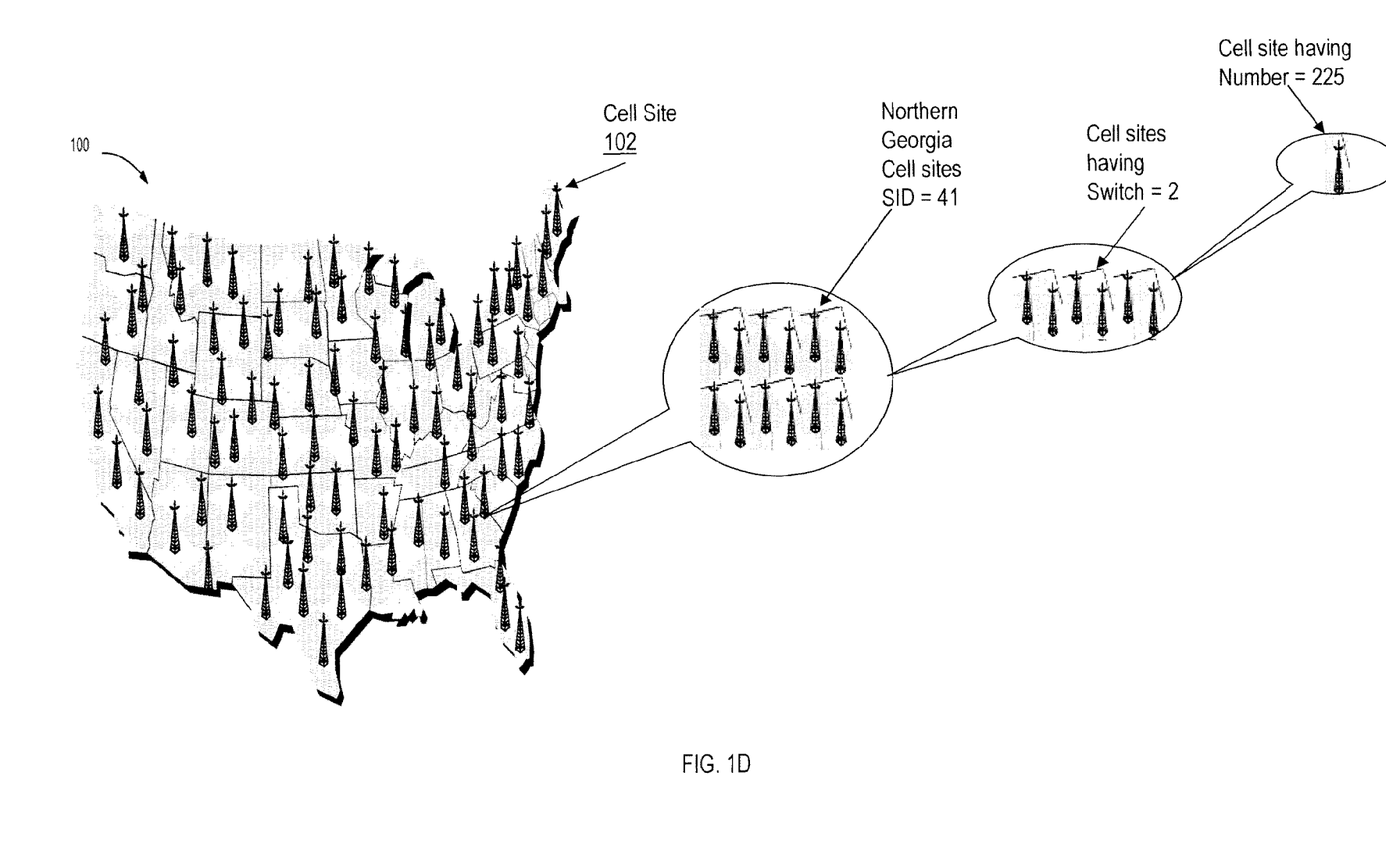
FIG. 1D is an illustration of a geographic area and corresponding cell sites to which identifiers are assigned

FIG. 1D is an illustration of an example of a geographical area and cell sites included therein to which identifiers are assigned. As explained previously, the communications network 11 (FIG. 1A) is served by a number of cell sites 102 that provide the communications network 11 with connectivity. These cell sites 102 are included across the geographical area (e.g., continental U.S., as shown in FIG. 1D) spanned by the network 11.

In the United States, the cell sites of a service provider (not shown) within a given geographical region are identified using a system identifier (SID) that is assigned by the FCC. The SID is often used for determining billing and roaming information. The SID is usually a numerical identifier. For example, the numerical identifier assigned to New York City for Verizon Wireless is 22. Similarly, SID of 41 is assigned to Verizon Wireless in Northern Georgia.

Although the SID specifies the service provider that a cell site 102 may belong to, it cannot be used to uniquely identify a cell site 102 from among other cell sites maintained by the service provider.

Other identifiers used for identifying cell sites 102 include identifiers that identify the devices (not shown) used at a cell site 102 to provide network connectivity. For example, every cell site 102 is identified using identifiers assigned to a switch of that cell site 102. In one example, a two digit numerical identifier is used for identifying the switch of each cell site 102. This assignment schemes identifies up to 100 switch configurations using identifiers ranging from 00 to 99. In the example shown in FIG. 1D, a number of cell sites in Northern Georgia (having SID=41) are shown to have switch identifier value (hereinafter switch ID) of 02.

As noted above, service providers further identify cell sites 102 by assigning a cell site value or a cell site count to the cell sites 102 included in each geographic area (e.g., northern Georgia). The cell site value can include any number or type of characters. In one example, the cell site value is a four digit numerical identifier. Using this four digit numerical identifier, up to 1000 cell sites are uniquely identified within each geographical area.

Although the SID, switch ID, and cell site value are used to identify the cell sites in a particular region, the cell sites utilizing similar devices for providing connectivity (switch ID), or a specific cell site in a particular geographical area, these identifiers are not unique across the entire geographical area 100 spanned by the network 11. In order to uniquely identify the cell sites providing the communications network 11 with connectivity across the entire network, a combination of SID, switch ID, and cell site value may be used. For example, each cell site 102 may be represented as:

Cell Site ID=SID. Switch ID. Cell site value.

The above ordering of the SID, switch ID, and cell site value provides the information necessary to uniquely identify the intended cell sites. Other orders and combinations of the SID, switch ID, and cell site value may be used. In the LTE network, the Cell Site ID may be generated and assigned by Serving Gateway (SGW) 35, which may be configured to serve as a mobility anchor for the bearers when mobile stations move from one eNB 104 to another. In the CDMA network, the Cell Site ID may be generated and assigned by the Mobile Switching Center (MSC). In the CDMA network, the cell site 102 may be associated with a specific Baste Station Transmitter (BTS) and the MSC may assign the Cell Site ID to such BTS. In contrast, in the LTE network, there may not be a specific device identify the cell site 102. To this end, the SGW 35 may maintain the Cell Site ID within its database and may associate with the Cell Site ID with the eNB 104 to define that cell site. The example Cell Site ID format presented above employs four numerical characters to represent SID, two numerical characters to represent switch ID, and four numerical characters to represent the cell site value. Accordingly, the example format presented above includes 10 numerical characters, each ranging from 0 to 9.

Using this format, each cell site 102 included across the network 11 is uniquely represented with a ten-digit numerical identifier (Cell Site ID) ranging from 0000.00.0000 to 9999.99.9999. This format allows for up to $10^{10}$ cell sites to be uniquely represented. As noted previously, currently most wireless service providers utilize less than or about 50,000 cell sites. Assuming that a total of 500,000 cell sites are currently being deployed across the continental United States, the exemplary format presented herein can uniquely represent all deployed cell sites. Given the large number of cell sites that may be uniquely represented using the format presented herein, future expansions of wireless networks and additional cell sites 102 can also be uniquely represented. For example, assuming that an additional 500,000 cell sites are utilized, totaling the number of cell sites 1,000,000 ($10^6$) cell sites, the current format can still uniquely represent all deployed cell site.

Although the example format for Cell Site ID allows for using up to 10 numerical characters, not all cell sites need to be represented using the maximum available number of characters. In some examples, fewer characters may be used. For example, a cell site 102 positioned in northern Georgia and having a SID=41, switch ID=2, and cell site value=225 (shown in FIG. 1D) is often represented as 41020225. Note that to comply with the above-described Cell Site ID format 999.99.9999, a leading zero is added to the switch ID and the cell site value. The leading zero for the SID is omitted. This Cell Site ID is unique and no other cell site is assigned to this Cell Site ID. Similarly, at a different region (e.g., gulf coast), the SID=5667, switch=12, and the cell site value=1714, resulting in the Cell Site ID of 5667121714.

Once a cell site 102 is uniquely identified, the identification information is used to uniquely relate a cell site 102 to its corresponding data traffic. The data traffic information that may be accumulated from monitoring of eNB operations includes information such as historical amount of data or voice communications traffic at any given hour at the cell site, expected data traffic, cell site traffic capacity, cell site performance data, data regarding devices connected to the cell site, data volume, number of calls dropped by the client, data regarding overall operating conditions of the cell site, etc.

Figure 2:
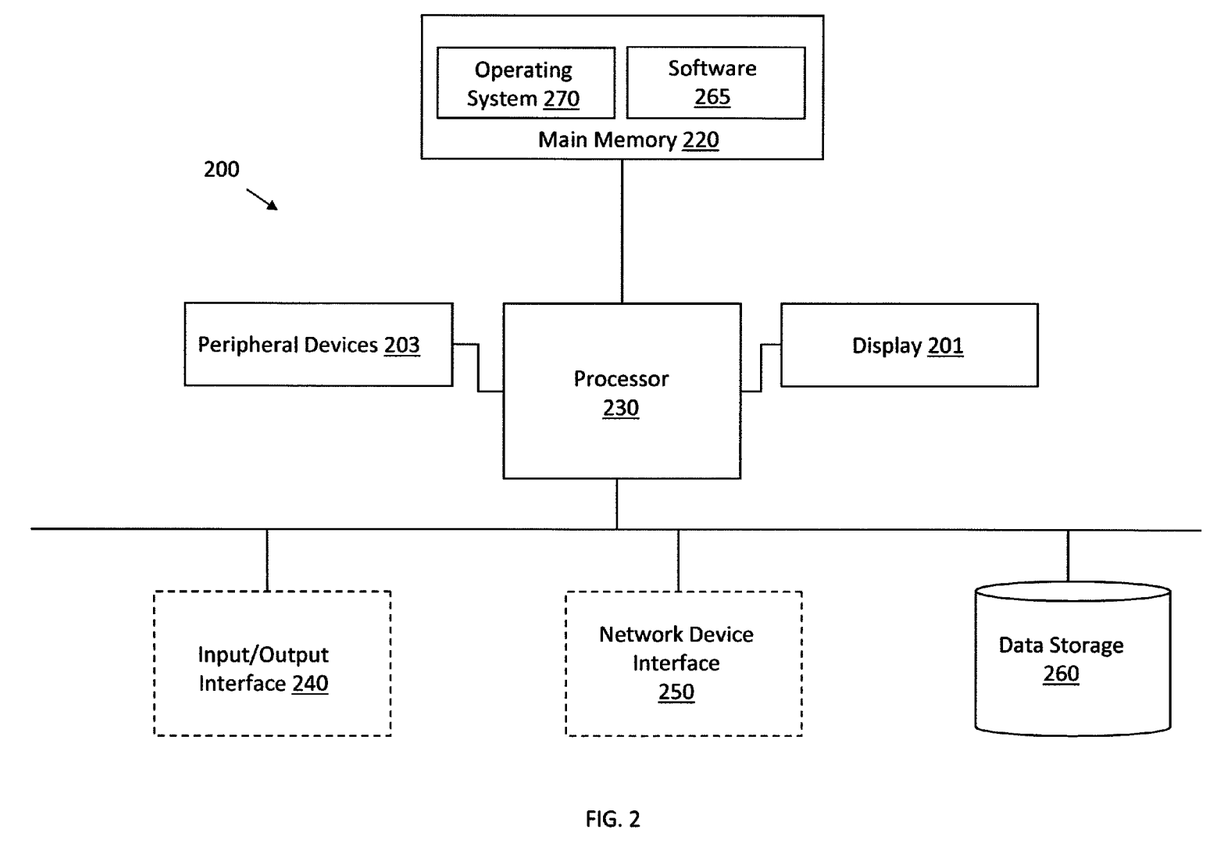
FIG. 2 is a diagram of components of a device that is used in determining, assigning, and/or storing the identifiers for evolved nodes and/or cell sites of a communications network.

FIG. 2 is a diagram of components of a device 200 that is used in determining, assigning, and/or storing the identifiers for eNBs (i.e., eNB ID) and/or cell sites (i.e., Cell Site ID) of a communications network 11. The device is maintained by one or more of the authorities overseeing the function and/or maintenance of eNBs 104 or cell sites 102. For example, the device may be maintained by the communications service provider that operates the communications network 11. In another implementation, the device 200 is co-located with the cell site, providing the desired information to the communication network 11. In one specific example, assuming the device 200 provides identifiers to eNBs 104, the device 200 is part of the OAM server 34 within the network 11. In another specific example, assuming the device 200 provides identifiers to cell sites 102, the device 200 is part of MSC or SGW. In either case, the device 200 may correspond to a variety of computational devices, for example a computer (e.g., a desktop computer, a laptop computer, or a handheld computer). Alternatively or additionally, the device 200 may be a specialized device of limited functionality.

The device 200 includes a processor 230 (e.g., Central Processing Unit) that carries out the operations of the device, executes various instructions, and manipulates data structures from the main memory 220. The processor 230 is coupled to a main memory 220. The main memory 220 may be a computer-readable memory and include combinations of non-volatile memory devices. The main memory 220 is configured to hold various software 265 and computer-executable instructions and data structures including computer-executable instructions and data structures that implement aspects described herein. For example, the software implements the procedures for obtaining the Market ID, eNB value, and cell site value for use in determining the eNB ID of an eNB. The Market ID, eNB value, and cell site value may be extracted from the traffic data coming from the eNB 104. The eNB value and the cell site value may be previously programmed into the eNB 104 by a technician and may be sent to the device 200 along with the traffic data. The Market ID, the eNB value, and the cell site value may be stored in data storage 260. In another implementation, the software 265 may include required procedures for generating the Market ID, eNB value and the cell site value, assigning them to the eNB 104 and/or the cell site 102, and storing them in the data storage 260. For example, the software 265 may further implement the procedures for determining the eNB Value and/or the operating spectrum of an eNB (for example, from a database that stores such information, such as data storage 260) and may assign the eNB Value to an eNB based on its operating spectrum. Regardless of how the Market ID, Cell site value, and eNB value are obtained (i.e., obtained from a database that stores such information, assigned by procedures implemented by the software 265, or obtained from traffic data received from the eNB 104), the software implements the required procedures for determining the eNB ID using these identifiers (i.e., Market ID, cell site value, eNB value). Once determined, the eNB ID is stored in a database, for example in data storage 260.

Similarly, the software 265 implements the procedures required for obtaining the SID, switch ID, and cell site value. The SID, switch ID, and cell site value may be obtained from a database that stores these values (e.g., database 260). In some examples, the software implements the procedures required for assigning the cell site value. Regardless of how the SID, switch ID, and cell site value are obtained (i.e., obtained from a database that stores such information or assigned by procedures implemented by the software 265), the software implements the required procedures for determining the Cell Site ID using these identifiers (i.e., SID, switch ID, and Cell site value). Once determined, the Cell Site ID is stored in a database, for example, in data storage 260.

The software further implements the procedures for relating the identification information of each cell site or eNB to its corresponding data traffic.

The main memory 220 also includes an operating system 270 that implements various conventional operating system functions including memory management and controlled access to various hardware elements of the device 200, such as a database storage 260, and task and process scheduling.

The processor 230 is coupled to various interfaces via an input/output (I/O) device interface 240. The I/O device interface 240 includes logic to interface with various input and/or output devices, such as a keypad or mouse and with the processor 230, and allow signals to be transferred between the processor 230 and other components. Further, interface devices such as speaker 210, microphone 207, peripheral devices 203, and display 201 are used to transfer signals to/from the processor 230 and main memory 220. The input/output interface 240 may include a USB port (not shown). The device 200 also includes a network device interface 250 that provides the device with access to a network connection to the communications network 11.

Hence, the identifier assignment techniques discussed by way of example herein may be implemented at least in part by computer readable code stored or otherwise embodied in a non-transitory computer readable medium. The computer readable code, such as the software discussed above relative to FIG. 2 may be stored or otherwise embodied in a computer readable medium. Non-transitory forms of such a medium, for example, include various types of semiconductor memories, disk storage devices or the like that may be used as the main memory 220 and/or the storage 260 in programmable device 200 of FIG. 2 or in other equipment that may hold such software before direct loading or downloading through a network for installation in a particular device.

Figure 3:
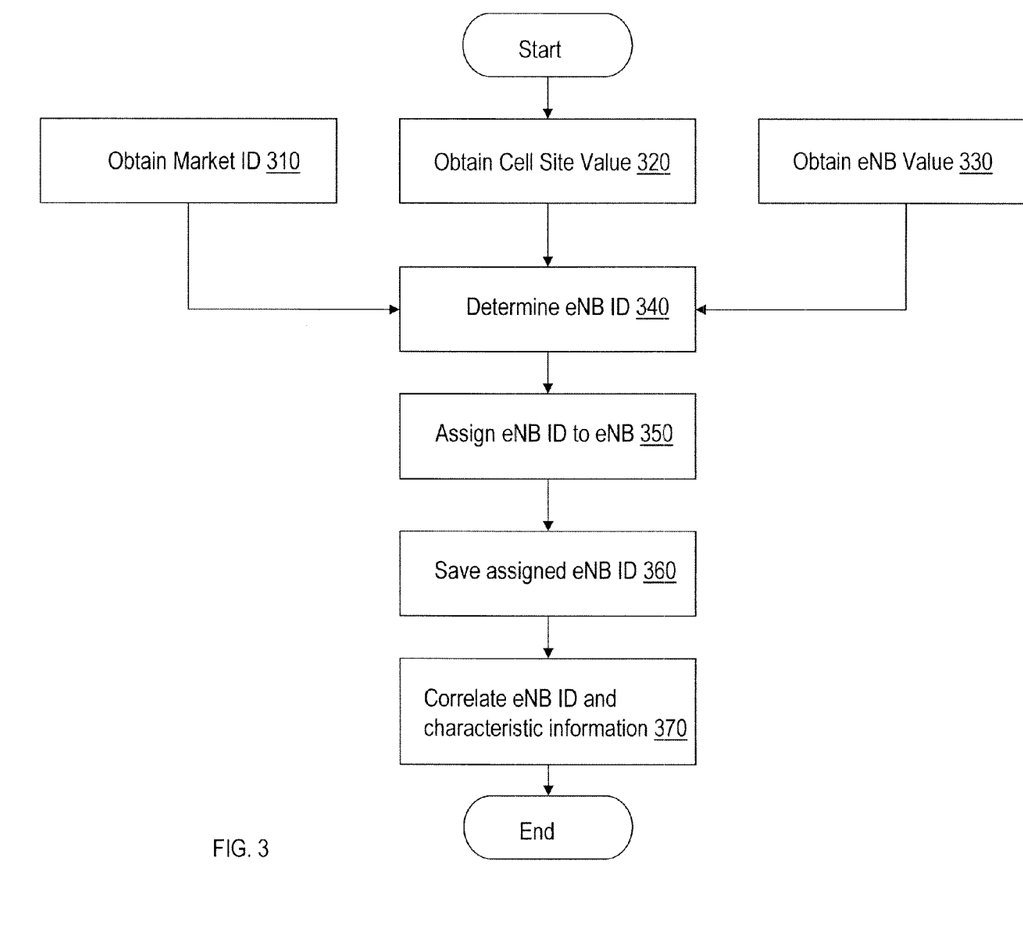
FIG. 3 is a flow diagram of procedures for assigning evolved node B identifiers.

FIG. 3 is a flow diagram of procedures for assigning eNB identifiers which can be carried out, for example, by the device 200, shown in FIG. 2. The procedures obtain the Market ID (block 310), cell site value (block 320), and eNB value (block 330) for an eNB 104 (FIG. 1C). For example, the Market ID, cell site value, and eNB ID are obtained from a database that stores these values. Alternatively or additionally, some of these values (e.g., Cell site value or eNB Value) are assigned by a device that assigns the identifiers, for example, by the device 200, shown in FIG. 2. The obtained Market ID, cell site value, and eNB value are then used to determine the eNB ID for the eNB 104 (block 340). For example, the eNB ID is determined according the format presented above by setting eNB ID=Market ID. Cell site value. eNB value.

The determined eNB ID is then assigned to the eNB (block 350). The assigned eNB ID is, for example, stored in a database of the device 200 (block 360), shown in FIG. 2, and associated with the eNB 104 such that the device 200 can recognize the eNB 104 using the identifier. The assigned identifier may also be stored in a memory portion of the eNB 104. The stored value of the eNB ID is then used to uniquely relate an eNB 104 to its corresponding data traffic (block 370). The information about data traffic of the identified eNB includes information such as historical amount of data or voice communications traffic at any given hour going through the identified eNB, expected data traffic, eNB traffic capacity, eNB performance data, data regarding devices connected to the eNB, data volume, number of calls dropped by the client, data regarding overall operating conditions of the eNB, etc. In one implementation, the data are sent to the OAM server 34 as a part of IP packet in the bearer established between the eNB 104 and the OAM server 34. The IP packet includes a header identifying the source and destination IP addresses and a body that includes the relevant data from the eNB 104. The data may routinely pulled by the OAM server 34. Alternatively, the data may be routinely pushed by the eNB 104.

Figure 4:
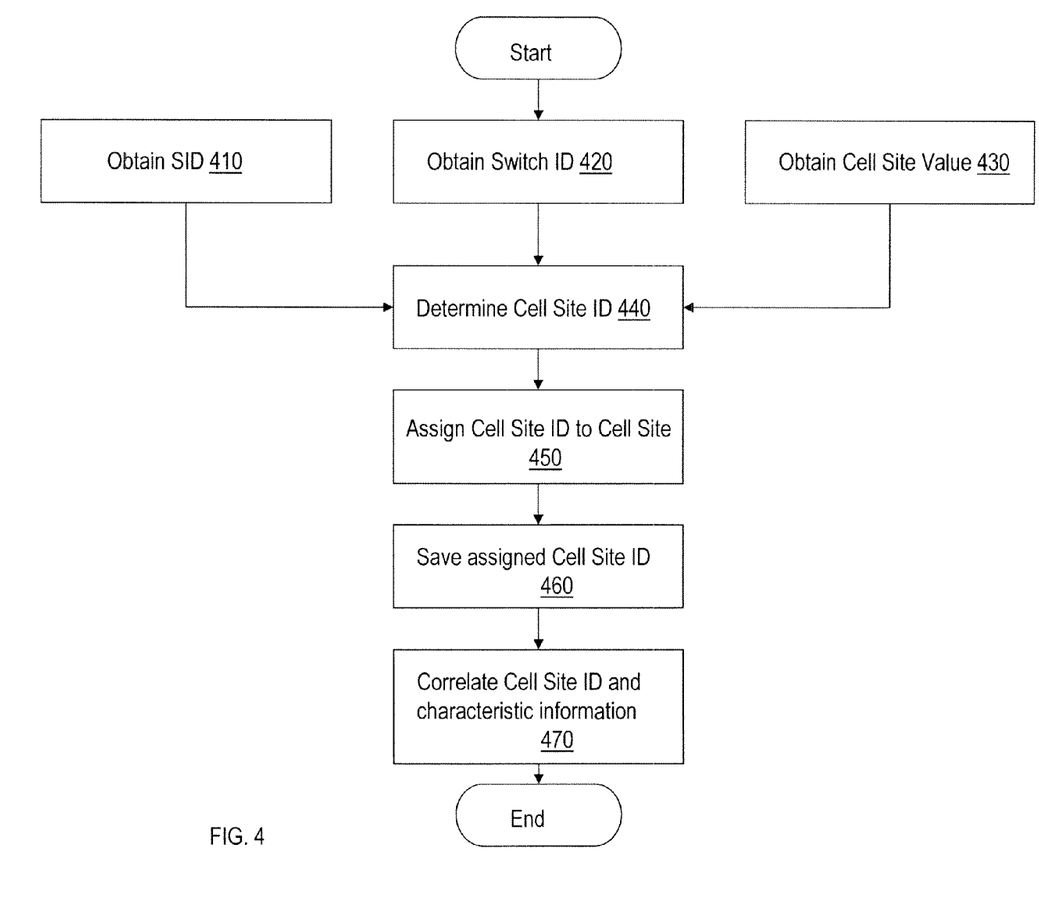
FIG. 4 is a flow diagram of procedures for assigning cell site identifiers.

FIG. 4 is a flow diagram of procedures for assigning Cell site identifiers which can be carried out, for example, by the device 200, shown in FIG. 2. The procedures obtain the SID (block 410), switch ID (block 420), and cell site value (block 430) for a cell site 102 (FIG. 1C). For example, the SID, switch ID, and cell site value are obtained from a database that stores these values. Alternatively or additionally, some of these values (e.g., SID or switch ID) are assigned by a device that assigns the identifiers, for example, by the device 200, shown in FIG. 2. The obtained SID, switch ID, and cell site value are then used to determine the Cell Site ID for the cell site 102 (block 440). For example, the Cell Site ID is determined according the format presented above by setting Cell Site ID=SID, switch ID, Cell site value.

The determined Cell Site ID is then assigned to the cell site (block 450). The assigned Cell Site ID is, for example, stored in a database of the device 200 (block 460), shown in FIG. 2, and associated with the cell site 102 such that the device 200 can recognize the cell site 102 using the identifier. The assigned identifier may also be stored in a memory portion of the cell site 102. The stored value of the Cell Site ID is then used to uniquely relate a cell site 102 to its corresponding data traffic (block 470). The information about data traffic includes information such as historical amount of data or voice communications traffic at any given hour at the cell site, expected data traffic, cell site traffic capacity, cell site performance data, data regarding devices connected to the cell site, data volume, number of calls dropped by the client, data regarding overall operating conditions of the cell site, etc.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

identifying, via a processor and from a database accessible to the processor, a system identifier, the system identifier being assigned to a plurality of cell sites included in a geographical subarea spanned by a wireless communications network;

identifying, via the processor and from the database, a cell site equipment identifier, the cell site equipment identifier being assigned to cell sites in the geographical subarea spanned by the wireless communications network;

identifying, via the processor and from the database, a cell site value identifier, the cell site value identifier being assigned to a cell site that provides the wireless communications network with wireless connectivity and that is among the plurality of cell sites included in the geographical subarea spanned by the wireless communications network;

combining, via the processor, the system identifier, the cell site equipment identifier, and the cell site value identifier to form a cell site identifier (Cell Site ID);

assigning, via the processor, the Cell Site ID to the cell site;

storing, via the processor and in the database, the assigned Cell Site ID in association with the cell site;

receiving, at the processor and from the cell site, information describing performance and operating conditions of the cell site;

monitoring the cell site, based on the information received from the cell site, by correlating the information received from the cell site to the Cell Site ID;

receiving, at the processor and from an evolved node B (eNB), information describing performance and operating conditions of the eNB, the information received from the eNB including an Internet Protocol (IP) address associated with the eNB and an IP address associated with a destination server including the processor, each IP address being a unique network routable IP address;

obtaining, via the processor, a geographical subarea identifier identifying the geographical subarea spanned by the wireless communications network, wherein the geographical subarea includes the eNB and the geographical subarea identifier is determined from the IP address associated with the eNB;

obtaining, via the processor, a geographical subarea-level cell site value identifier identifying a cell site located within the geographical subarea and including the eNB;

obtaining, via the processor, a cell site-level eNB value identifier associated with the eNB;

combining via the processor the geographical subarea identifier, the geographical subarea-level cell site value identifier, and the cell site-level eNB value identifier to form an eNB identifier (eNB ID);

assigning via the processor the eNB ID to the eNB positioned in the cell site positioned within a geographical subarea spanned by a wireless communications network;

storing, via the processor and in the database, the eNB ID in association with the eNB; and monitoring, based on the information received from the eNB, the eNB by correlating the information received from the eNB to the eNB ID.

2. The method of claim 1 wherein:

the geographical subarea is a subarea of a larger geographical area spanned by the wireless communications network, the geographical subarea identifier uniquely identifies the geographical subarea in the larger geographical area, receiving the information from the eNB includes receiving, over an established Long Term Evolution (LTE) pipe between the processor and the eNB, IP packets including the information received from the eNB, and the information received from the eNB includes information related to traffic passing through the eNB.

3. The method of claim 1 wherein the geographical subarea-level cell site value identifier and the cell site-level eNB value identifier are included in the information received from the eNB.

4. The method of claim 1 wherein:

the geographical subarea includes a plurality of cell sites that provide the wireless communications network with connectivity;

the geographical subarea-level cell site value identifier uniquely identifies the cell site from among the plurality of cell sites;

each cell site of the plurality of cell sites includes a plurality of eNBs that provide the wireless communications network with connectivity;

the cell site-level eNB value identifier uniquely identifies the eNB from among the plurality of eNBs; and the geographical subarea-level cell site value is the cell site value when the eNB belongs to the cell site assigned the Cell Site ID.

5. The method of claim 1 wherein the cell site-level eNB value identifier includes at least one alphabetical character representing a spectrum in which the eNB operates and at least one numerical character representing a number assigned to the eNB within the spectrum.

6. The method of claim 1 wherein the geographical subarea is a subarea of a larger geographical area spanned by the wireless communications network and wherein the system identifier identifies the plurality of cell sites included in the geographical subarea from cell sites included in the larger geographical area.

7. The method of claim 1 wherein the system identifier is a numerical identifier assigned to the plurality of cell sites included in the geographical subarea by an authority overseeing wireless communications within the geographical subarea.

8. The method of claim 1 wherein the cell site equipment identifier uniquely identifies the cell site in the geographical subarea operating using similar equipments from among other cell sites included in the geographical subarea.

9. The method of claim 8 wherein the cell site value identifier uniquely identifies the cell site from among the cell sites in the geographical subarea operating using similar equipments.

10. The method of claim 1 wherein the cell site equipment identifier uniquely identifies cell site using at least one of similar executive cellular processors (ECP) or similar mobile transmitters (MTX).

11. A computer program product comprising a non-transitory computer readable medium having computer readable code stored thereon, which, when executed by a processor, configures the processor to:

assign a cell site identifier (Cell Site ID) to a cell site that provides a wireless communications network with wireless connectivity, the cell site belonging to a plurality of cell sites included in a geographical subarea spanned by the wireless communications network, the Cell Site ID being a function of a unique system identifier assigned to the plurality of cell sites included in the geographical subarea, a unique cell site equipment identifier assigned to cell sites in the geographical subarea operating using similar equipments, and a unique cell site value identifier assigned to the cell site;

receive, from the cell site, information describing performance and operating conditions of the cell site;

monitor the cell site, based on the information received from the cell site, by correlating the information received from the cell site to the Cell Site ID;

assign an evolved node B (eNB) identifier (eNB ID) to an eNB positioned in a cell site positioned within a geographical subarea spanned by the wireless communications network, the eNB ID being a function of a unique geographical subarea identifier, a unique geographical subarea-level cell site value identifier, and a unique cell site-level eNB value identifier;

receive, from the eNB, information describing performance and operating conditions of the eNB; and monitor, based on the information received from the eNB, the eNB by correlating the information received from the eNB to the eNB ID.

12. The computer program product of claim 11 wherein the geographical subarea is a subarea of a larger geographical area spanned by the wireless communications network and wherein the unique geographical subarea identifier uniquely identifies the geographical subarea in the larger geographical area.

13. The computer program product of claim 11 wherein the geographical subarea identifier is a numerical identifier assigned to the geographical subarea by an authority overseeing wireless communications within the geographical subarea.

14. The computer program product of claim 11 wherein:
the geographical subarea includes a plurality of cell sites that provide the wireless communications network with connectivity;
the unique geographical subarea-level cell site value identifier uniquely identifies the cell site from among the plurality of cell sites; and
the unique geographical subarea-level cell site value identifier is the unique cell site value identifier when the eNB is positioned in the cell site assigned the Cell Site ID.

15. The computer program product of claim 14 wherein each cell site of the plurality of cell sites includes a plurality of eNBs that provide the wireless communications network with connectivity and wherein the unique cell site-level eNB value identifier uniquely identifies the eNB from among the plurality of eNBs.

16. The computer program product of claim 11 wherein the cell site-level eNB value identifier includes at least one alphabetical character representing a spectrum in which the eNB operates and at least one numerical character representing a number assigned to the eNB within the spectrum.

17. The computer program product of claim 11 wherein the geographical subarea is a subarea of a larger geographical area spanned by the wireless communications network and wherein the unique system identifier identifies the plurality of cell sites included in the geographical subarea from cell sites included in the larger geographical area.

18. The computer program product of claim 11 wherein the system identifier is a numerical identifier assigned to the plurality of cell sites included in the geographical subarea by an authority overseeing wireless communications within the geographical subarea.

19. The computer program product of claim 11 wherein the unique cell site equipment identifier uniquely identifies the cell site in the geographical subarea operating using similar equipments from among other cell sites included in the geographical subarea.

20. The computer program product of claim 19 wherein the unique cell site value identifier uniquely identifies the cell site from among the cell sites in the geographical subarea operating using similar equipments.

21. The computer program product of claim 11 wherein the unique cell site equipment identifier uniquely identifies cell site using at least one of similar executive cellular processors (ECP) or similar mobile transmitters (MTX).

* * * * *